(12) United States Patent
Lee et al.

(10) Patent No.: US 11,170,266 B2
(45) Date of Patent: Nov. 9, 2021

(54) APPARATUS AND METHOD FOR IDENTIFYING OBJECT

(71) Applicant: LG ELECTRONICS INC., Seoul (KR)

(72) Inventors: Moon Hyun Lee, Seoul (KR); Sang Hoon Kim, Seoul (KR); Jin Gyeong Kim, Seoul (KR); Jin Seok Im, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 16/597,649

(22) Filed: Oct. 9, 2019

(65) Prior Publication Data

US 2020/0042831 A1    Feb. 6, 2020

(30) Foreign Application Priority Data

Sep. 11, 2019    (KR) .......................... 10-2019-0112662

(51) Int. Cl.
*G06K 9/62*    (2006.01)
*G06K 9/42*    (2006.01)
*G06K 9/40*    (2006.01)

(52) U.S. Cl.
CPC ............. *G06K 9/6262* (2013.01); *G06K 9/40* (2013.01); *G06K 9/42* (2013.01); *G06K 9/6256* (2013.01)

(58) Field of Classification Search
CPC ...... G06N 3/0454; G06N 3/08; G06K 9/6256; G06K 9/6267; G06K 9/4628
See application file for complete search history.

(56) References Cited

U.S. PATENT DOCUMENTS

2019/0279345 A1*    9/2019    Kim ..................... G06K 9/6256

FOREIGN PATENT DOCUMENTS

KR            101955919         3/2019

* cited by examiner

*Primary Examiner* — Ross Varndell
(74) *Attorney, Agent, or Firm* — Lee, Hong, Degerman, Kang & Waimey

(57) ABSTRACT

An artificial intelligence based object identifying apparatus and a method thereof which are capable of easily identifying a type of an object in an image using a small size learning model are disclosed. According to an embodiment of the present disclosure, an object identifying apparatus configured to identify an object from an image includes a receiver configured to receive the image, an image modifier configured to modify the received image by predetermined methods to generate a plurality of modified images, and an object determinator configured to apply the plurality of modified images to a neural network trained to identify an object from the image to obtain a plurality of identification results and determine a type of an object in the received image based on the plurality of identification results.

9 Claims, 5 Drawing Sheets

[FIG. 1]
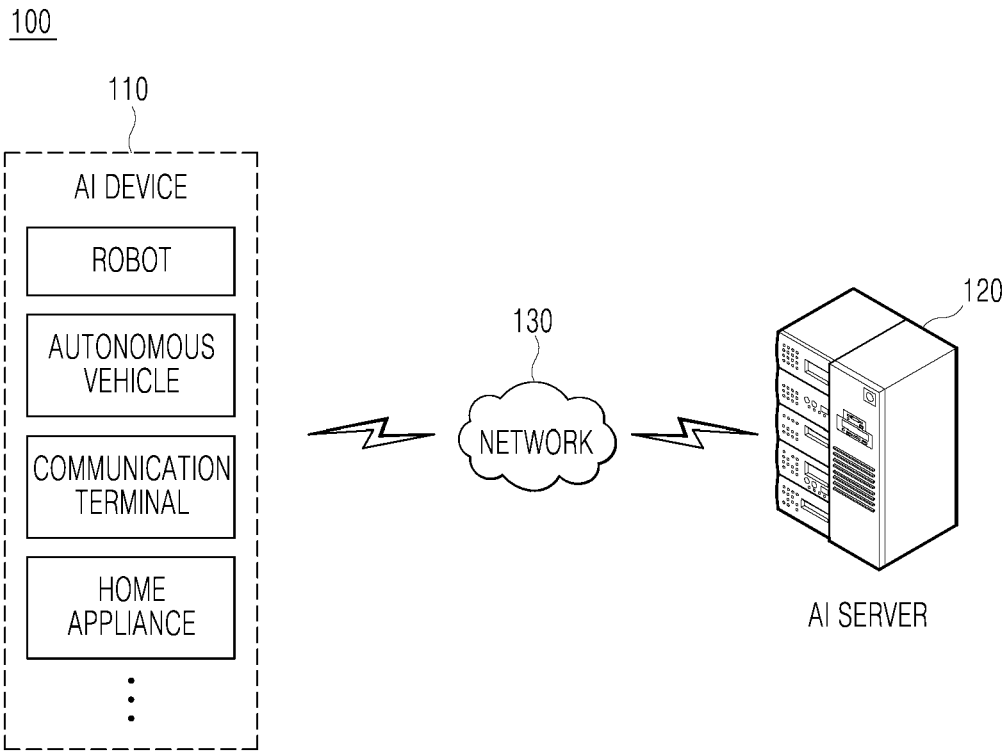
[FIG. 2]
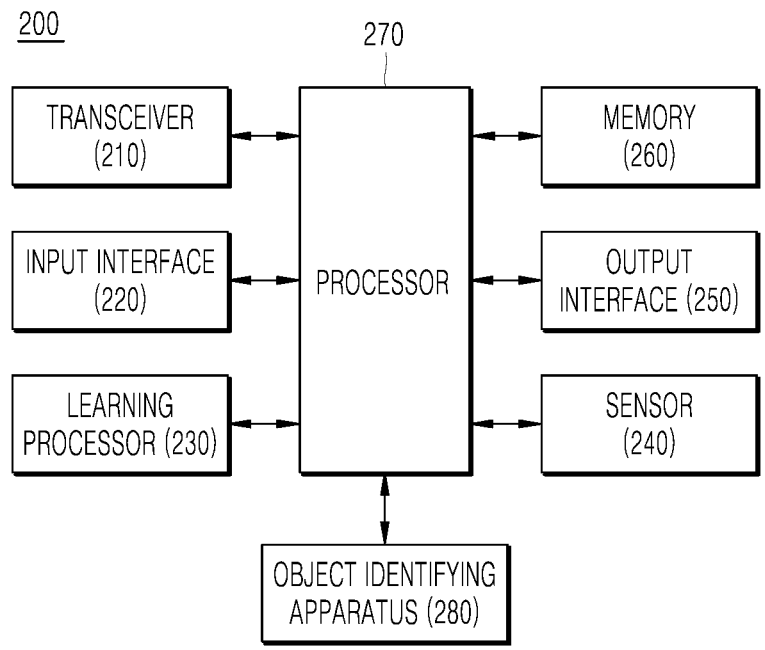

[FIG. 3]
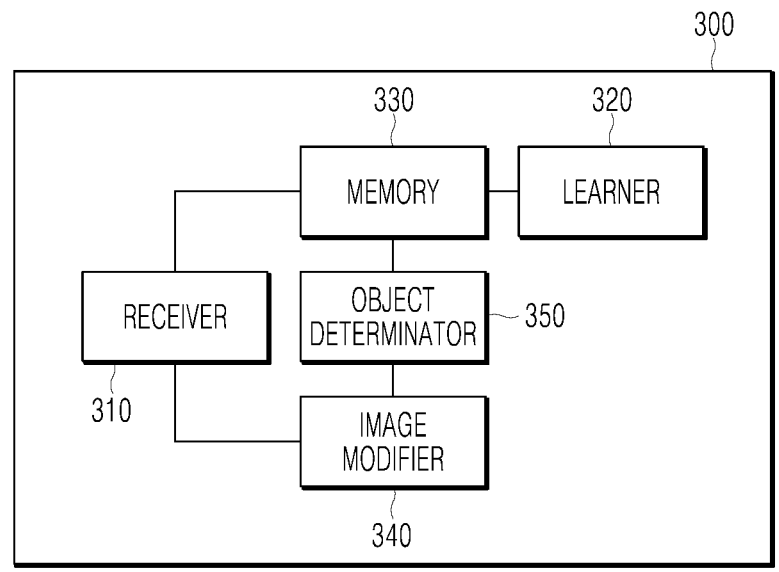
[FIG. 4]
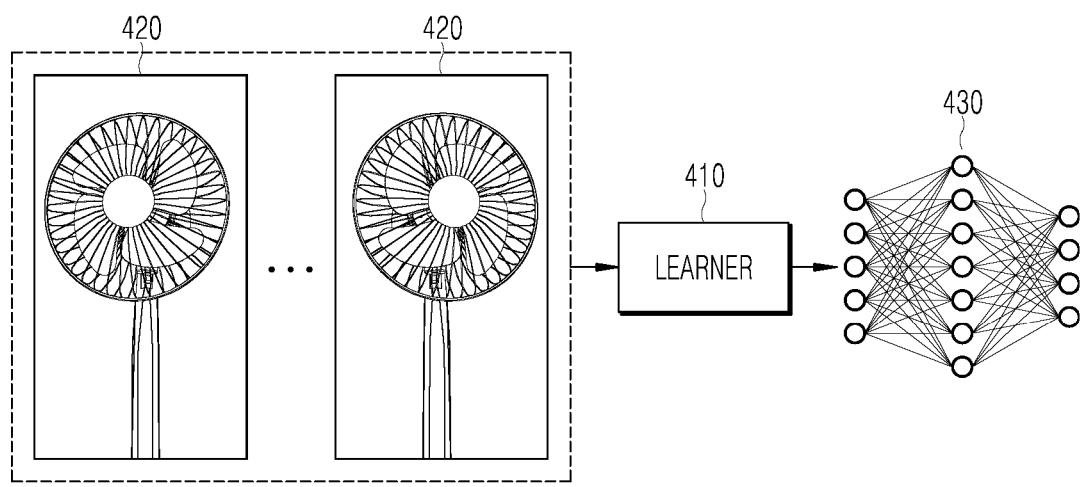

[FIG. 5]
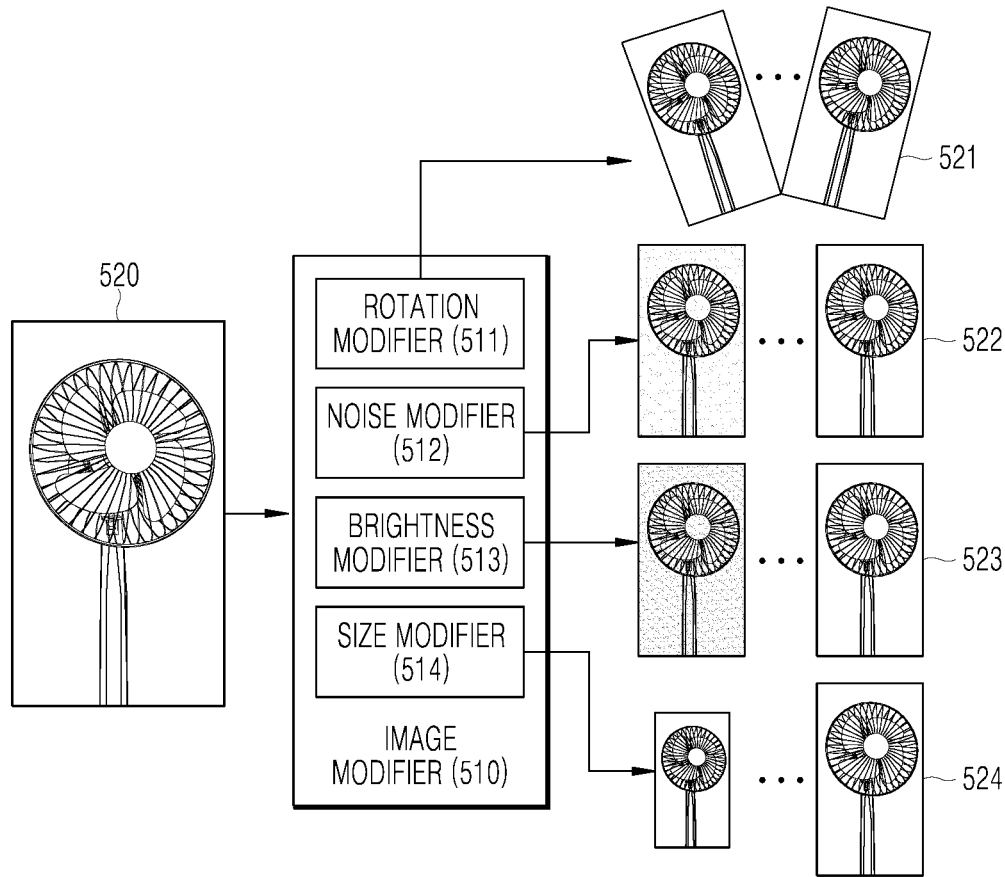
[FIG. 6]
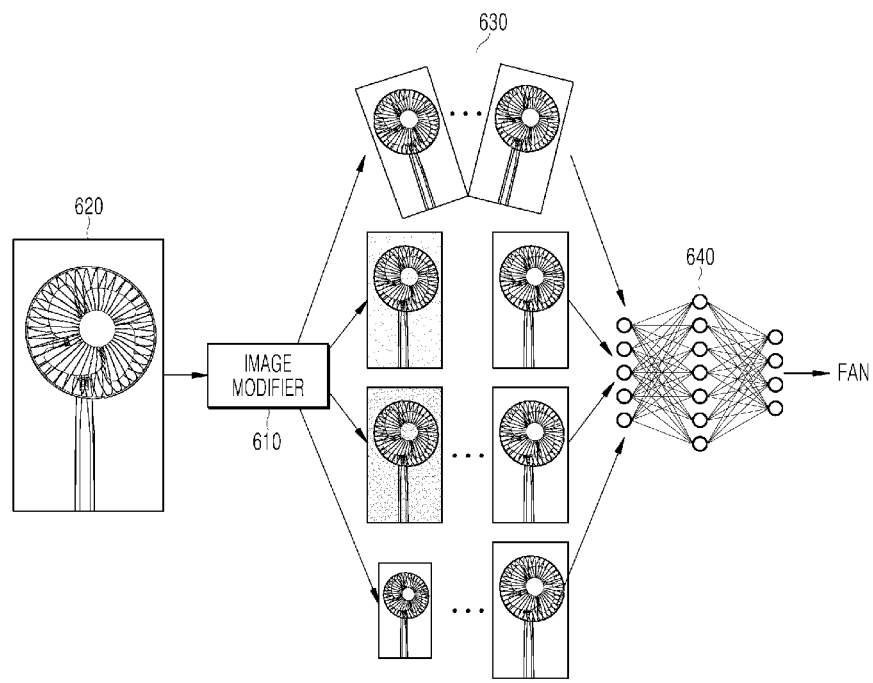

[FIG. 7]
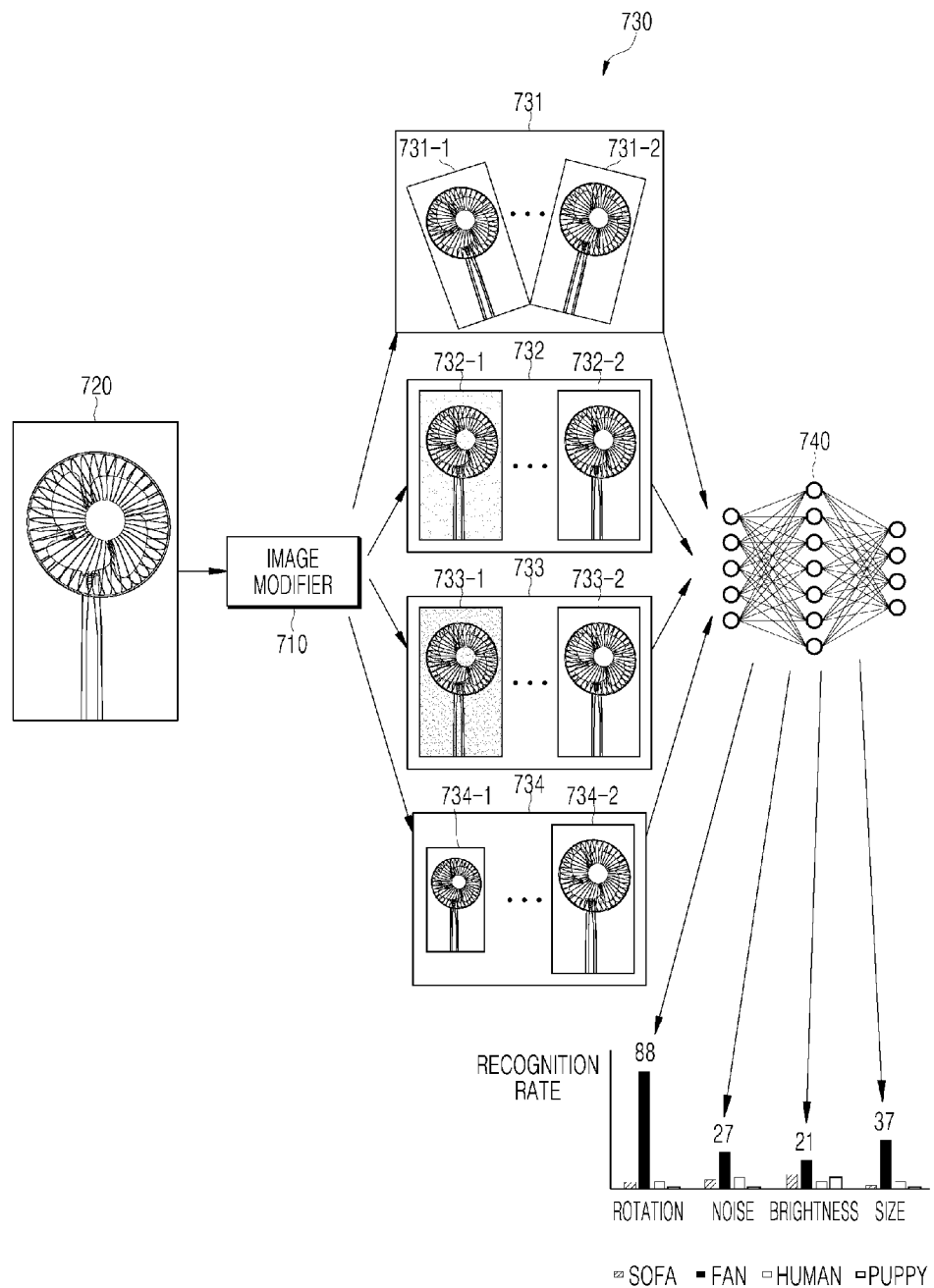

[FIG. 8]
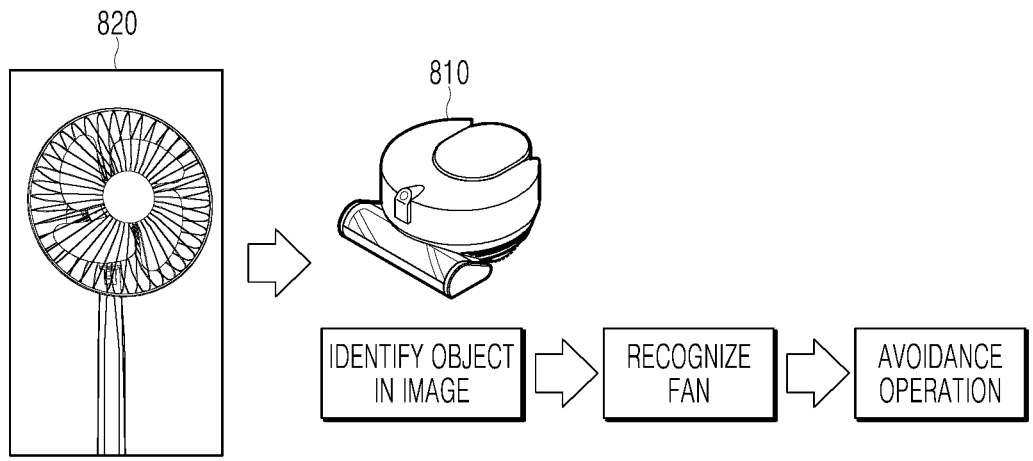
[FIG. 9]
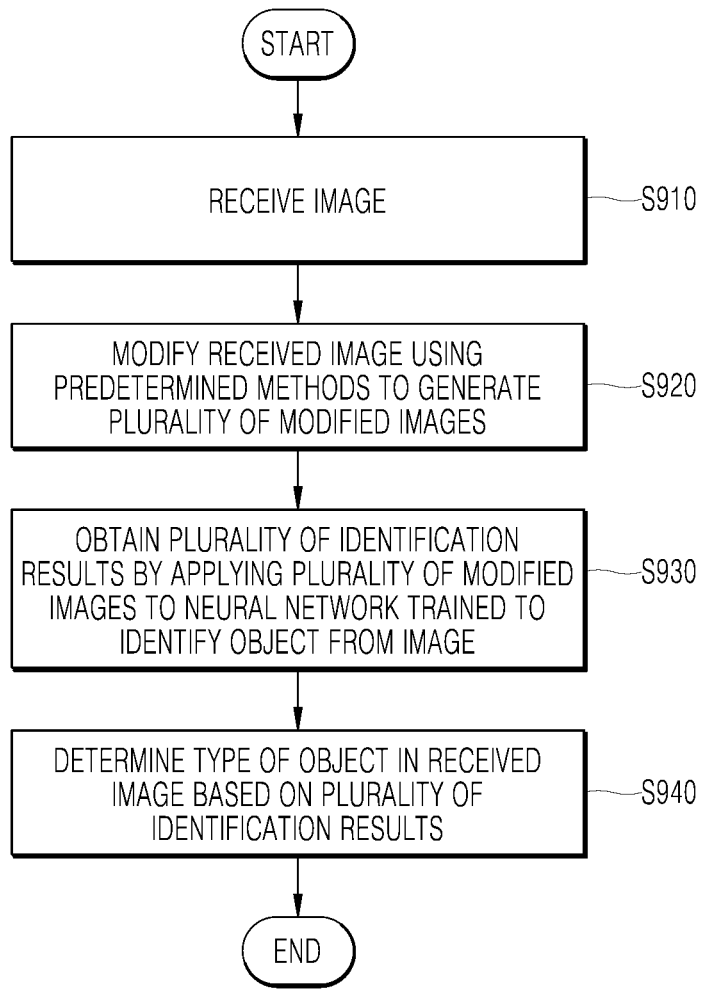

APPARATUS AND METHOD FOR IDENTIFYING OBJECT

CROSS-REFERENCE TO RELATED APPLICATION

Pursuant to 35 U.S.C. § 119(a), this application claims the benefit of earlier filing date and right of priority to Korean Patent Application No. 10-2019-0112662, filed on Sep. 11, 2019, the contents of which are hereby incorporated by reference herein in its entirety.

BACKGROUND

1. Technical Field

The present disclosure relates to an apparatus and a method for identifying an object which are capable of easily identifying a type of an object in an image using a small size learning model (for example, a neural network).

2. Description of Related Art

Generally deep learning is defined as a set of machine learning algorithms which attempts a high level of abstraction through a combination of several nonlinear transformations and is a field of machine learning which teaches computers human's way of thinking in a large framework.

When there is data, many studies are conducted to represent the data to be understood by the computer and apply the data to the learning and as a result of this effort, the development of the deep learning technique is actively performed to be applied to various fields (for example, image recognition, speech recognition, natural language processing).

However, in order to ensure an accuracy of the deep learning, big data is necessary in a learning step so that a capacity of a memory which stores the big data is increased and thus a learning time during which the big data is used and a performance of a processor which trains using the big data are inevitably increased. Therefore, not only high power is necessary, but also the cost is increased.

In the meantime, as a method for reducing a big data processing time in the learning step, the related art suggests a method for shortening a time to set a region of interest (for example, a tumor portion in a medical image) by automatically setting the region of interest based on a reference set in the image data as big data, to consequently reduce a learning time during which the big data is used in the learning step.

However, according to the related art, even though a time to set the region of interest in the image data as big data is shortened to shorten the big data processing time in the learning step, it is difficult to reduce an amount of big data itself required in the learning step. Therefore, there is a limitation to shorten the learning time during which the big data is used in the learning step and the problem caused by the learning using the big data cannot be solved.

RELATED ART DOCUMENT

Patent Document

Patent Document: Korean Registered Patent Publication No. 10-1955919

SUMMARY OF THE INVENTION

An aspect of an embodiment of the present disclosure is to reduce a capacity of a memory which stores an image, a learning time to train a neural network and a performance of a processor (for example, a learner) which performs the training by training a small size neural network which identifies an object from the image using a small amount of images (for example, a learning image), thereby driving the memory and the processor at a low power and saving the cost.

Further, another aspect of an embodiment of the present disclosure is to precisely identify a type of an object in a received image by modifying the received image using a predetermined method (for example, at least one of image rotation, removal of a noise in the image, image brightness adjustment, and image size adjustment) to apply the modified image to the neural network, thereby accurately identifying a type of the object in the received image.

According to an aspect of the present disclosure, an object identifying apparatus configured to identify an object from an image includes a receiver configured to receive the image; an image modifier configured to modify the received image by predetermined methods to generate a plurality of modified images; and an object determinator configured to apply the plurality of generated modified images to a neural network trained to identify an object from the image to obtain a plurality of identification results and determine a type of an object in the received image based on the plurality of identification results.

According to an embodiment of the present disclosure, the image modifier includes at least one of a rotation modifier configured to differently rotate the received image to generate a plurality of modified images; a noise modifier configured to differently remove a noise in the received image to generate a plurality of modified images; a brightness modifier configured to differently adjust a brightness of the received image to generate a plurality of modified images; and a size modifier configured to differently adjust a size of the received image to generate a plurality of modified images.

According to an embodiment of the present disclosure, each of the plurality of identification results includes a type of an object identified from the modified image and a recognition rate which is probability information indicating the probability that the object identified from the modified image is the identified type of object.

According to an embodiment of the present disclosure the object determinator determines a type of an object having the highest recognition rate among the plurality of identification results as a type of an object in the received image.

According to an embodiment of the present disclosure when the highest recognition rate is lower than a predetermined reference set value, the image modifier differently adjusts a modification degree of modifying using the predetermined methods and regenerates the plurality of modified images based on the adjusted modification degree and the object determinator redetermines the type of the object in the received image, based on the plurality of regenerated modified images.

According to an embodiment of the present disclosure, the predetermined methods include at least one of image rotation, noise removal in the image, brightness adjustment of an image, and size adjustment of an image and the object determinator determines a type of an object having a recognition rate which is equal to or higher than a set value, for the plurality of items, among the plurality of identification results, as a type of an object in the received image.

According to an embodiment of the present disclosure, the predetermined methods include at least one of image rotation, noise removal in the image, brightness adjustment of an image, and size adjustment of an image and the image modifier adjusts a modification degree differently for each item and generates a plurality of modified images based on the adjusted modification degree.

According to an embodiment of the present disclosure, the image modifier sets a modification unit and a modification range for the modification degree for every item and adjusts differently the modification degree based on the set modification unit within the set modification range.

According to an embodiment of the present disclosure, the object identifying apparatus may further include a learner configured to train the neural network using the same or less number of learning images compared to a predetermined number.

According to another aspect of the present disclosure, an object identifying method for identifying an object from an image, receiving the image, generating a plurality of modified images by modifying the received image by predetermined methods, obtaining a plurality of identification results by applying the plurality of generated modified images to a neural network which is trained to identify an object from an image, and determining a type of an object in the received image, based on the plurality of identification results.

According to an embodiment of the present disclosure, the generating of a plurality of modified images includes at least one of differently rotating the received image to generate a plurality of modified images, differently removing a noise in the received image to generate a plurality of modified images, differently adjusting a brightness of the received image to generate a plurality of modified images, and differently adjusting a size of the received image to generate a plurality of modified images.

According to an embodiment of the present disclosure, each of the plurality of identification results includes a type of an object identified from the modified image and a recognition rate which is probability information indicating the probability that the object identified from the modified image is the identified type of object.

According to an embodiment of the present disclosure, the determining of a type of an object in the received image includes, determining a type of an object having the highest recognition rate among the plurality of identification results as a type of an object in the received image.

According to an embodiment of the present disclosure, the generating of a plurality of modified images includes adjusting differently a modification degree of modifying using the predetermined methods to regenerate a plurality of modified images when the highest recognition rate is lower than a predetermined reference set value and the determining of a type of an object in the received image includes redetermining a type of an object in the received image, based on the plurality of regenerated modified images.

According to an embodiment of the present disclosure, the predetermined methods include at least one of image rotation, noise removal in the image, brightness adjustment of an image, and size adjustment of an image and the determining of a type of an object in the received image includes determining a type of an object having a recognition rate which is equal to or higher than a set value, for the plurality of items among the plurality of identification results, as a type of an object in the received image.

According to an embodiment of the present disclosure, the predetermined methods include at least one of image rotation, noise removal in the image, brightness adjustment of an image, and size adjustment of an image and the generating of a plurality of modified images includes adjusting a modification degree differently for each item and generating a plurality of modified images based on the adjusted modification degree.

According to an embodiment of the present disclosure, the adjusting of a modification degree differently for each item and generating a plurality of modified images based on the adjusted modification degree includes setting a modification unit and a modification range with respect to the modification degree for every item and differently adjusting the modification degree based on the set modification unit within the set modification range.

According to an embodiment of the present disclosure, the object identifying method may further include, before receiving the image, training the neural network using the same or less number of learning images compared to a predetermined number.

According to another aspect of the present disclosure, an object identifying apparatus configured to identify an object from an image includes a memory and one or more processors configured to execute instructions stored in the memory and the one or more processors are configured to receive the image, generate a plurality of modified images by modifying the received image by predetermined methods, obtain a plurality of identification results by applying the plurality of generated modified images to a neural network trained to identify an object from an image and determine a type of an object in the received image, based on the plurality of identification results.

In addition, another method and another system for implementing the present disclosure and a computer-readable recording medium having a computer program stored therein to perform the method may be further provided.

Other aspects and features as well as those described above will become clear from the accompanying drawings, claims, and the detailed description of the present disclosure.

According to the present disclosure, it is possible to reduce a capacity of a memory which stores an image, a learning time to train a neural network and a performance of a processor which performs the training by training a small size neural network which identifies an object from the image using a small amount of images, thereby driving the memory and the processor at a low power and saving the cost.

According to the present disclosure, the received image is modified using predetermined methods (at least one of image rotation, noise removal in the image, image brightness adjustment, and image size adjustment) to be applied to the small size neural network, thereby accurately identifying the type of the object in the received image.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is a view illustrating an example of an AI system including an AI device including an object identifying apparatus according to an embodiment of the present disclosure, an AI server, and a network connecting the above-mentioned components;

FIG. 2 is a view illustrating a configuration of an AI device including an object identifying apparatus according to an embodiment of the present disclosure;

FIG. 3 is a view illustrating a configuration of an object identifying apparatus according to an embodiment of the present disclosure;

FIG. 4 is a view for explaining an example of training a neural network in an object identifying apparatus according to an embodiment of the present disclosure;

FIG. 5 is a view illustrating an example of a configuration of an image modifier in an object identifying apparatus according to an embodiment of the present disclosure;

FIG. 6 is a view illustrating an example of identifying a type of an object in an image in an object identifying apparatus according to an embodiment of the present disclosure;

FIG. 7 is a view illustrating another example of identifying a type of an object in an image in an object identifying apparatus according to an embodiment of the present disclosure;

FIG. 8 is a view for explaining an example of an operation of an AI device to which an object identifying apparatus according to an embodiment of the present disclosure is applied; and FIG. 9 is a flowchart illustrating an object identifying method according to an embodiment of the present disclosure.

DETAILED DESCRIPTION

The advantages and features of the present disclosure and ways to achieve them will be apparent by making reference to embodiments as described below in detail in conjunction with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will not be provided.

FIG. 1 is a view illustrating an example of an AI system including an AI device including an object identifying apparatus according to an embodiment of the present disclosure, an AI server, and a network connecting the above-mentioned components.

Referring to FIG. 1, an artificial intelligence (AI) system 100 includes an AI device 110, an AI server 120, and a network 130.

Referring to FIG. 1, the AI device 100 may include an artificial intelligence based object identifying apparatus of the present disclosure and for example, include at least one of a robot, an autonomous vehicle, a communication terminal (for example, a mobile phone, a smart phone, or a tablet PC), and a home appliance (for example, a robot cleaner).

Here, the artificial intelligence refers to a field of studying artificial intelligence or a methodology to create the artificial intelligence and machine learning refers to a field of defining various problems treated in the artificial intelligence field and studying a methodology to solve the problems. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

The machine learning may train an artificial neural network by supervised learning.

Supervised learning may refer to a method for training an artificial neural network with training data that has been given a label. In addition, the label may refer to a target answer (or a result value) to be guessed by the artificial neural network when the training data is inputted to the artificial neural network.

As a result, the artificial intelligence based object identifying apparatus trains the artificial neural network using a machine learning algorithm or requests a trained artificial neural network from the AI server 120 to receive the trained artificial neural network from the AI server 120. Further, when the image is received, the object identifying apparatus may estimate a type of the object in the received image using the trained artificial neural network.

When the AI server 120 receives the request for the trained artificial neural network from the AI device 110, the AI server 120 may train the artificial neural network using the machine learning algorithm and provide the trained artificial neural network to the AI device 110. The AI server 120 may be composed of a plurality of servers to perform distributed processing. In this case, the AI server 120 may be included as a configuration of a portion of the AI device 110, and may thus perform at least a portion of the AI processing together.

The network 130 may connect the AI device 110 and the AI server 120. The network 130 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 130 may also send and receive information using short distance communication and/or long distance communication. The short-range communication may include Bluetooth®, radio frequency identification (RFID), infrared data association (IrDA), ultra-wideband (UWB), ZigBee, and Wi-Fi (wireless fidelity) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA).

The network 130 may include connection of network elements such as a hub, a bridge, a router, a switch, and a gateway. The network 130 can include one or more connected networks, for example, a multi-network environment, including a public network such as an internet and a private network such as a safe corporate private network. Access to the network 130 may be provided through one or more wire-based or wireless access networks. Furthermore, the network 130 may support the Internet of things (IoT) network for exchanging and processing information between distributed elements such as things, 3G, 4G, Long Term Evolution (LTE), 5G communications, or the like.

FIG. 2 is a view illustrating a configuration of an AI device including an object identifying apparatus according to an embodiment of the present disclosure.

Referring to FIG. 2, the AI device 200 includes a transceiver 210, an input interface 220, a learning processor 230, a sensor 240, an output interface 250, a memory 260, a processor 270, and an object identifying apparatus 280.

The transceiver 210 may transmit or receive data to/from external devices such as other AI device or AI server using wireless/wired communication techniques. For example, the transceiver 210 may transmit or receive sensor data, user input, a learning model, a control signal, and the like with the external devices.

In this case, the communications technology used by the transceiver 210 may be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC).

The input interface 220 may obtain various types of data. The input interface 220 may include a camera for inputting an image signal, a microphone for receiving an audio signal, and a user input interface for receiving information inputted from a user. Here, the camera or the microphone is treated as a sensor so that a signal obtained from the camera or the microphone may also be referred to as sensing data or sensor information.

The input interface 220 may obtain, for example, learning data for model learning and input data used when output is obtained using a learning model. The input interface 220 may obtain raw input data. In this case, the processor 270 or the learning processor 230 may extract an input feature by preprocessing the input data.

The learning processor 230 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation of classifying the detected hand motion. The learning processor 230 may perform AI processing together with a learning processor of the AI server.

Further, the learning processor 230 may include a memory which is integrated or implemented in the AI device 200, but is not limited thereto and may be implemented using an external memory directly coupled to the AI device or a memory sustained in the external device.

The sensor 240 may obtain at least one of internal information of the AI device 200, surrounding environment information of the AI device 200, or user information by using various sensors. The sensor 240 may include a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (LiDAR) sensor, radar, or a combination thereof.

The output interface 250 may generate a visual, auditory, or tactile related output. The output interface 250 may include a display outputting visual information, a speaker outputting auditory information, and a haptic module outputting tactile information.

The memory 260 may store data supporting various functions of the AI device 200. For example, the memory 260 may store input data, the learning data, the learning model, learning history, or the like, obtained from the input interface 220.

The memory 260 may serve to temporarily or permanently store data processed by the processor 270. Here, the memory 260 may include magnetic storage media or flash storage media, but the scope of the present disclosure is not limited thereto. The memory 260 as described above may include magnetic storage media or flash storage media, but the scope of the present disclosure is not limited thereto. The memory 260 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

The processor 270 may determine at least one executable operation of the AI device 200 based on information determined or generated by using a data analysis algorithm or a machine learning algorithm. In addition, the processor 270 may control components of the AI device 200 to perform the determined operation.

To this end, the processor 270 may request, retrieve, receive, or use data of the learning processor 230 or the memory 260, and may control components of the AI device 200 to execute a predicted operation or an operation determined to be preferable of the at least one executable operation.

In this case, when it is required to be linked with the external device to perform the determined operation, the processor 270 may generate a control signal for controlling the external device and transmit the generated control signal to the corresponding external device.

The processor 270 obtains intent information about user input, and may determine a requirement of a user based on the obtained intent information. The processor 270 may obtain intent information corresponding to user input by using at least one of a speech to text (STT) engine for converting voice input into a character string or a natural language processing (NLP) engine for obtaining intent information of a natural language.

In an embodiment, the at least one of the STT engine or the NLP engine may be composed of artificial neural networks, some of which are trained according to a machine learning algorithm. In addition, the at least one of the STT engine or the NLP engine may be trained by the learning processor 230, trained by a learning processor of an AI server, or trained by distributed processing thereof.

The processor 270 collects history information including, for example, operation contents and user feedback on an operation of the AI device 200, and stores the history information in the memory 260 or the learning processor 230, or transmits the history information to an external device such as an AI server. The collected history information may be used to update a learning model.

The processor 270 may control at least some of components of the AI device 200 to drive an application stored in the memory 260. Furthermore, the processor 270 may operate two or more components included in the AI device 200 in combination with each other to drive the application.

The object identifying apparatus 280 may include a receiver, a learner, a memory with a low capacity, an image modifier, and an object determinator. Here, the receiver may be included in the input interface 220, the learner may be included in the learning processor 230, and the memory with a low capacity may be included in the memory 260.

FIG. 3 is a view illustrating a configuration of an object identifying apparatus according to an embodiment of the present disclosure.

Referring to FIG. 3, an object identifying apparatus 300 according to an embodiment of the present disclosure may include a receiver 310, a learner 320, a memory 330, an image modifier 340, and an object determinator 350.

i) Learning Step

For example, the receiver 310 receives the same or less number of plurality of learning images compared to a predetermined number, from an external camera of the object identifying apparatus 300 or an internal camera (not illustrated) of the object identifying apparatus 300 to store the learning images in the memory 330. Here, the plurality of learning images is images obtained by photographing various types of objects (for example, a sofa, a fan, human, or a pet) by various methods (for example, varying a direction, a focal point, a brightness, and a size) to be utilized to train the neural network. The number of plurality of learning images may be much smaller than the number of learning images used in a learning step for deep learning of the related art.

The learner 320 trains the neural network using the plurality of learning images stored in the memory 330 to identify the object from the image and store the trained neural network in the memory 330. In this case, the learner 320 uses the relatively smaller number of plurality of learning images compared to the number of images used in the learning step for deep learning of the related art to train the neural network so that a learning time (that is, a time to train the neural network to identify the object from the image) may be shortened. In this case, since the neural network is trained based on the same or less number of plurality of learning images compared to the predetermined number, the neural network may be a small size neural network (for example, a simple algorithm).

The memory 330 may store the plurality of learning images and the neural network trained using the plurality of learning images. The number of plurality of learning images is less than a predetermined number (for example, 100) and the neural network has a small size, so that the memory 330 may have a small capacity as compared with the capacity of the memory used for the deep learning of the related art and may be driven at a low power.

ii) Inferring Step

The receiver 310 may receive the image from, for example, the external camera or the internal camera.

The image modifier 340 may modify the received image using predetermined methods to generate a plurality of modified images. Here, the predetermined methods may include at least one of image rotation, noise removal in the image, image brightness adjustment, and image size adjustment.

The image modifier 340 may adjust a modification degree differently for each item and generate a plurality of modified images based on the adjusted modification degree. In this case, the image modifier 340 may set a modification unit and a modification range for the modification degree for every item and adjust the modification degree differently based on the set modification unit within the set modification range. Here, a specific example of the modification unit, the modification range, and the modification degree will be described with reference to FIG. 5 below, for the convenience of description.

For example, the image modifier 340 may include at least one of a rotation modifier which differently rotates the received image to generate a plurality of modified images, a noise modifier which differently removes noises in the received image to generate a plurality of modified images, a brightness modifier which differently adjusts the brightness of the received image to generate a plurality of modified images, and a size modifier which differently adjusts the size of the received image to generate a plurality of modified images.

In the meantime, the image modifier 340 may differently adjust the modification degree (or modification unit, modification range) to modify by the predetermined methods and regenerate the plurality of modified images based on the adjusted modification degree (or modification unit, modification range) in accordance with control by the object determinator 350.

The object determinator 350 applies the plurality of generated modified images to a neural network (that is, a neural network stored in the memory 330) which is trained to identify the object from the image to obtain a plurality of identification results and determines a type of the object in the received image based on the plurality of identification results. Here, the object determinator 350 may obtain a plurality of identification results as many as the number of a plurality of modified images.

The plurality of identification results, respectively, may include 1) a type of object (for example, "a sofa", "a fan", "human", or "a pet") identified from the modified image and 2) a recognition rate (for example, 5% for the sofa, 88% for the fan, 6% for the human, and 1% for pet) which is probability information indicating the probability that the object identified from the modified image is the identified type of the object.

As an example of determining a type of an object in the received image, the object determinator 350 may determine a type of an object having the highest recognition rate among the plurality of identification results as the type of the object in the received image.

In this case, when the highest recognition rate is lower than a predetermined reference set value (for example, 90%), the object determinator 350 may allow the image modifier 340 to differently adjust the modification degree to modify using the predetermined methods, regenerate a plurality of modified images based on the adjusted modification degree, and redetermine the type of the object in the received image, based on the plurality of regenerated modified images.

As another example of determining a type of the object in the received image, the object determinator 350 may determine a type of the object having a recognition rate which is equal to or higher than a predetermined first set value with respect to the plurality of items, respectively, among the plurality of identification results, as the type of the object in the received image. For example, when the first set value is 80% and among a plurality of identification results obtained by applying the plurality of rotated modified images to the neural network, a first highest recognition rate is 88% for the fan, and among a plurality of identification results obtained by applying the plurality of images modified by adjusting the size to the neural network, a second highest recognition rate is 81% for the fan, the object determinator may determine the type of object, "a fan" which shows first and second recognition rates which are higher than the first set value for two items (rotation and size) as the type of the object in the received image.

As another example of determining a type of object in the received image, the object determinator 350 modifies the images using one item of the predetermined methods to generate a plurality of modified images and when among the plurality of identification results obtained by applying the plurality of modified images to the neural network, the highest recognition rate is equal to or higher than a second set value (here, the second set value may be higher than the first set value), a type of an object having the highest recognition rate may be determined as the type of the object in the image. For example, when the set value is 90% and among the plurality of identification results obtained by applying the plurality of rotated modified images to the neural network, the highest recognition rate is "95% for the fan", the object determinator 350 may determine "a fan" which is the object having the highest recognition rate in one item as a type of the object in the received image.

As a result, the object determinator 350 may determine the type of the object in the received image, in accordance with a set object identification reference, based on the plurality of identification results obtained by applying the plurality of modified images to the neural network. Here, as the set object identification reference, as mentioned above, for example, regardless of the item, a type of an object having the highest recognition rate is determined as a type of the object in the received image (a first object identification reference), a type of an object having a recognition rate which is equal to or higher than the first set value, for the plurality of items, is determined as a type of the object in the received image (a second object identification reference), or a type of an object having a recognition rate which is equal to or higher than the second set value in one item is determined as a type of the object in the received image (a third object identification reference). In this case, when it is difficult to determine the type of the object in the received image based on the set object identification reference (for example, the first object identification reference), the object determinator 350 may apply another object identification reference (the first object identification reference or the second object identification reference). Here, for example, when the first object identification reference is applied, if there is a plurality of highest recognition rates, or when the second object identification reference is applied, if there is a plurality of recognition rates which is equal to or higher than the first set value, or when the third object identification reference is applied, if there is a plurality of recognition rates which is equal to or higher than the second set value, it is difficult to determine the type of the object in the received image.

As a result, in the learning step, even though the object identifying apparatus 300 of the present disclosure trains a small size neural network which identifies the object from the image using the relatively less number of learning images than the number of learning images of the related art, in the inferring step, the received image is modified by predetermined methods (for example, at least one of image rotation, noise removal in the image, image brightness adjustment, and image size adjustment) to apply the modified image to the neural network. Therefore, the type of the object in the received image may be accurately identified.

In the meantime, the object identifying apparatus according to the embodiment of the present disclosure may include various configurations. For example, the object identifying apparatus is a device configured to identify the object from the image and includes a memory and one or more processors configured to execute instructions stored in the memory. Here, one or more processors may correspond to the receiver 310, the learner 320, the image modifier 340, and the object determinator 350 and the memory may correspond to the memory 330.

Specifically, the one or more processors may be configured to receive the image, modify the received image using the predetermined methods to generate a plurality of modified images, apply the plurality of modified images to the neural network trained to identify the object from the image to obtain a plurality of identification results, and determine the type of the object in the received image based on the plurality of identification results.

FIG. 4 is a view for explaining an example of training a neural network in an object identifying apparatus according to an embodiment of the present disclosure.

Referring to FIG. 4, the learner 410 in the object identifying apparatus may train the neural network 430 to identify the object from the image using the plurality of learning images 420 stored in the memory and store the trained neural network 430 in the memory.

Here, the plurality of learning images may be images obtained by photographing various types of objects (for example, a sofa, a fan, human, a pet, etc.) by various methods (for example, varying a direction, a focal point, a brightness, a size, etc.). The number of a plurality of learning images (for example, 100) may be much smaller than the number of learning images (for example, 10000) used in a learning step for deep learning of the related art.

FIG. 5 is a view illustrating an example of a configuration of an image modifier in an object identifying apparatus according to an embodiment of the present disclosure.

Referring to FIG. 5, the image modifier 510 in the object identifying apparatus may modify the received image based on at least one of the predetermined methods such as image rotation, noise removal in the image, image brightness adjustment, and image size adjustment to generate a plurality of modified images. In this case, the image modifier 510 sets a modification unit and a modification range for a modification degree for every item and adjusts the modification degree differently based on the set modification unit within the set modification range.

Specifically, the image modifier 510 may include, for example, a rotation modifier 511, a noise modifier 512, a brightness modifier 513, and a size modifier 514.

The rotation modifier 511 may rotate the received image 520 to generate a modified image. In this case, the rotation modifier 511 may adjust differently a modification degree (for example, 3°, 6°, 9°, . . . ) based on a set modification unit (3°) within a modification range (for example, 0° to 360°) set with regard to the rotation and generate a plurality of modified images 521 in accordance with the adjusted modification degree.

The noise modifier 512 may remove the noise in the received image 520 to generate a modified image. In this case, the noise modifier 512 may adjust differently a modification degree (for example, 5%, 10%, 15%, . . . ) based on a set modification unit (5%) within a modification range (for example, 0% to 100% relative to the entire noise) set with regard to the noise and generate a plurality of modified images 522 in accordance with the adjusted modification degree.

Further, the noise modifier 512 may employ various noise removing filters to generate an image from which the noise is removed, by various methods and differently remove the noise while changing a parameter value of the filter to generate a plurality of modified images.

The brightness modifier 513 may adjust the brightness of the received image 520 to generate a modified image. In this case, the brightness modifier 513 may adjust differently the modification degree (for example, 200 nit, 210 nit, 220 nit, . . . ) based on a set modification unit (10 nit) within a modification range (for example, 200 to 500 nit) set with regard to a brightness (or luminance) and generate a plurality of modified images 523 in accordance with the adjusted modification degree.

The size modifier 514 may adjust the size of the received image 520 to generate a modified image. In this case, the size modifier 514 may adjust differently the modification degree (for example, 0.2 times, 0.4 times, 0.6 times, . . . ) based on a set modification unit (0.2 times) within a modification range (for example, 0.2 times to 5 times) set with regard to the size and generate a plurality of modified images 524 in accordance with the adjusted modification degree.

Further, the image modifier 510 may adjust differently the modification degree for each of the image rotation, noise removal in the image, image brightness adjustment, and image size adjustment and modify the image 520 based on the modification degree adjusted for every item to generate a plurality of modified images 521, 522, 523, and 524, but is not limited thereto. As one example, the image modifier 510 may adjust differently the modification degree for all items and modify the image 620 in accordance with the adjusted modification degree to generate a plurality of modified images. For example, the image modifier 510 may modify the image 520 by applying rotation of 3°, 5% noise removal, 200 nit brightness adjustment, 0.2 times size adjustment to generate first modified images and modify the image 520 by applying rotation of 6°, 10% noise removal, 210 nit brightness adjustment, 0.4 times size adjustment to generate second modified images.

FIG. 6 is a view illustrating an example of identifying a type of an object in an image in an object identifying apparatus according to an embodiment of the present disclosure.

Referring to FIG. 6, the image modifier 610 in the object identifying apparatus may receive an image 620 and determine the type of the object in the received image 620. Specifically, the image modifier 610 may modify the image 620 by applying the predetermined methods (for example, at least one of image rotation, noise removal in the image, image brightness adjustment, and image size adjustment) as described with reference to FIG. 5, to generate a plurality of modified images 630.

The object determinator in the object identifying apparatus may be, for example, a neural processing unit (NPU) and apply the plurality of modified images 630 to the neural network 640 which is trained to identify the object from the image to obtain a plurality of identification results. Here, the plurality of identification results may include a type of an object (for example, "a sofa", "a fan", "human", or "a pet") identified from the modified image and a recognition rate (for example, 5% for the sofa, 88% for the fan, 6% for the human, and 1% for the pet) which is probability information indicating the probability that the object identified from the modified image is the identified type of the object.

Thereafter, the object determinator may determine a type ("a fan") of the object having the highest recognition rate (for example, 88%) among the plurality of identification results obtained by applying the plurality of modified images 630 to the neural network 640 as the type of the object in the received image.

FIG. 7 is a view illustrating another example of identifying a type of an object in an image in an object identifying apparatus according to an embodiment of the present disclosure.

Referring to FIG. 7, an image modifier 710 in the object identifying apparatus may receive an image 720 and determine a type of an object in the received image 720. Specifically, the image modifier 710 may modify the image 720 by applying the predetermined methods (for example, at least one of image rotation, noise removal in the image, image brightness adjustment, and image size adjustment) as described with reference to FIG. 5, to generate a plurality of modified images 730. In this case, the image modifier 710 may differently rotate the image 720 to generate a plurality of modified images 731 and differently remove the noise from the image 720 to generate a plurality of modified images 732. Further, the image modifier 710 may differently adjust a brightness of the image 720 to generate a plurality of modified images 733 and differently adjust a size of the image 720 to generate a plurality of modified images 734.

For example, as an identification result obtained by applying a modified image 731-1 obtained by rotating the image 720 by 3° to a neural network 740, the object determinator may obtain types of objects identified from the rotated modified image, that is, "a sofa", "a fan", "human", and "a pet" and a recognition rates (for example, 5% for the sofa, 88% for the fan, 6% for the human, and 1% for the pet) which is probability information indicating the probability that an object identified from the rotated modified image 731-1 is the identified type of object (that is, the probability that the object identified from the rotated modified image is "a sofa", "a fan", "human", or "a pet"). Further, the object determinator may apply a modified image 731-2 obtained by rotating the image 720 by 6° to the neural network 740 to obtain an identification result (for example, recognition rates are 2% for the sofa, 90% for the fan, 5% for the human, and 2% for the pet). In this case, an identification result with regard to the modified image 731-1 obtained by rotating by 3° and an identification result with regard to the modified image 731-2 by rotating by 6° may be different from each other.

As an identification result obtained by applying a modified image 732-1 obtained by removing 5% of noise from the image 720 to the neural network 740, the object determinator may obtain types of objects identified from the image modified by removing the noise, that is, "a sofa", "a fan", "human", and "a pet" and a recognition rate (for example, 7% for the sofa, 27% for the fan, 9% for the human, and 3% for the pet) which is probability information indicating the probability that an object identified from the image 732-1 obtained by removing a noise is the identified type of object. Further, the object determinator may apply a modified image 732-2 obtained by removing 10% of noise from the image 720 to the neural network 740 to obtain an identification result (for example, 7% for the sofa, 30% for the fan, 8% for the human, and 5% for the pet). In this case, an identification result with regard to the modified image 732-1 obtained by removing 5% of noise and an identification result with regard to the modified image 732-2 obtained by removing 10% of noise may be different from each other.

As an identification result obtained by applying an image 733-1 modified by adjusting a brightness of the image 720 to 200 nit to the neural network 740, the object determinator may obtain types of objects identified from the image 733-1 modified by adjusting the brightness, that is, "a sofa", "a fan", "human", and "a pet" and a recognition rate (for example, 11% for the sofa, 21% for the fan, 7% for the human, and 9% for the pet) which is probability information indicating the probability that an object identified from the image 733-1 modified by adjusting the brightness is the identified type of object. Further, the object determinator may apply the image 733-2 modified by adjusting the brightness of the image 720 to 210 nit to the neural network 740 to obtain an identification result (for example, 20% for the sofa, 19% for the fan, 15% for the human, and 10% for the pet). In this case, an identification result with regard to the image 733-1 modified by adjusting the brightness to 200 nit and an identification result with regard to the image 733-2 modified by adjusting the brightness to 210 nit may be different from each other.

Further, as an identification result obtained by applying an image 734-1 modified by adjusting a size of the image 720 by 0.2 times to the neural network 740, the object determinator may obtain types of objects identified from the image 734-1 modified by adjusting the size, that is, "a sofa", "a fan", "human", and "a pet" and a recognition rate (for example, 2% for the sofa, 37% for the fan, 5% for the human, and 2% for the pet) which is probability information indicating the probability that an object identified from the image 734-1 modified by adjusting the size is the identified type of object. Further, the object determinator may apply the image 734-2 modified by adjusting the size of the image 720 by 0.4 times to the neural network 740 to obtain the identification result (for example, 5% for the sofa, 81% for the fan, 6% for the human, and 9% for the pet). In this case, an identification result with regard to the image 734-1 modified by adjusting the size by 0.2 times and an identification result with regard to the image 734-2 modified by adjusting the size by 0.4 times may be different from each other.

Thereafter, the object determinator may determine a type of the object having the highest recognition rate among the plurality of identification results obtained by applying the plurality of modified images 730 to the neural network 740 as the type of the object in the received image, but is not limited thereto.

As another example, the object determinator may determine a type of the object having recognition rates, each of which is equal to or higher than the first set value, for the plurality of items, among the plurality of identification results obtained by applying the plurality of modified images 730 to the neural network 740, as the type of the object in the received image.

For example, the object determinator may select the highest first recognition rate (for example, 88% for the fan) from the plurality of identification results obtained by applying the plurality of rotated modified images 731 to the neural network 740 and select the highest second recognition rate (for example, 30% for the fan) from the plurality of identification results obtained by applying the plurality of images 732 modified by removing the noise to the neural network 740. Further, the object determinator may select the highest third recognition rate (for example, 20% for the fan) from the plurality of identification results obtained by applying the plurality of images 733 modified by adjusting the brightness to the neural network 740 and select the highest fourth recognition rate (for example, 81% for the fan) from the plurality of identification results obtained by applying the plurality of images 734 modified by adjusting the size to the neural network 740.

For example, when the first set value is 80%, since the selected first and fourth recognition rates are equal to or higher than the first set value, the object determiner may determine "a fan" (which is a type of object having first and second recognition rates equal to or higher than the first set value in two items (rotation and size)) as a type of an object in the image 720.

As another example, the object determinator may generate the plurality of modified images by modifying the image 720 using one of the predetermined methods and among the plurality of identification results obtained by applying the plurality of modified images to the neural network 740, when the highest recognition rate is equal to or higher than a second set value (the second set value may be higher than the first set value), determine the type of the object having the highest recognition rate as the type of the object in the image 720. For example, when the second set value is 90% and among the plurality of identification results obtained by applying the plurality of rotated modified images 731 to the neural network 740, the highest first recognition rate is 95% for the fan, the object determinator may determine "a fan" which is the object having the highest recognition rate in one item as a type of the object in the image 720.

FIG. 8 is a view for explaining an example of an operation of an AI device to which an object identifying apparatus according to an embodiment of the present disclosure is applied.

Referring to FIG. 8, the object identifying apparatus may be applied to the AI device. For example, the object identifying apparatus may be applied to a robot cleaner 810 as an AI device.

The robot cleaner 810 may include, for example, a camera and if an object is sensed based on an image photographed by the camera during the movement, the robot cleaner 810 may determine a type of the object in the image using the object identifying apparatus installed therein. The robot cleaner 810 may control the motion (for example, a direction, a speed, and a distance of the movement) based on the determined type of the object.

For example, when a type of the object in a position (or a direction) to move is an immovable object (for example, a fan or a sofa), the robot cleaner 810 may change the movement direction to avoid the object.

In contrast, when the type of the object in the position to move is a moving object (for example, human or a pet), the robot cleaner 810 reduces the movement speed or pauses and then if the object moves to a position different from the position to move, increases the movement speed or move to a position to move again.

FIG. 9 is a flowchart illustrating an object identifying method according to an embodiment of the present disclosure. Here, an object identifying apparatus which implements the object identifying method of the present disclosure receives the same or less number of plurality of learning images compared to a predetermined number and trains a small size neural network in advance to identify the object from the image using the plurality of received learning images. Here, the plurality of learning images are images obtained by photographing various types of objects (for example, a sofa, a fan, human, or a pet) by various methods (for example, varying a direction, a focal point, a brightness, and a size).

Referring to FIG. 9, in step S910, for example, the object identifying apparatus may receive an image from an external camera of the object identifying apparatus or an internal camera of the object identifying apparatus.

In step S920, the object identifying apparatus may modify the received image by predetermined methods to generate a plurality of modified images. For example, the object identifying apparatus may differently rotate the received image to generate a plurality of modified images, differently remove the noise in the received image to generate a plurality of modified images, differently adjust the brightness of the received image to generate a plurality of modified images, or differently adjust the size of the received image to generate a plurality of modified images.

That is, the predetermined methods may include at least one of image rotation, noise removal in the image, brightness adjustment of an image, and size adjustment of an image. The object identifying apparatus may adjust a modification degree differently for each item and generate a plurality of modified images based on the adjusted modification degree. In this case, the object identifying apparatus may set a modification unit and a modification range for the modification degree for every item and adjust the modification degree differently based on the set modification unit within the set modification range.

In step S930, the object identifying apparatus may apply the plurality of modified images to a neural network trained to identify the object from the image to obtain a plurality of identification results. Here, the plurality of identification results, respectively, may include a type of object (for example, "a sofa", "a fan", "human", or "a pet") identified from the modified images and a recognition rate (for example, 5% for the sofa, 88% for the fan, 6% for the human, and 1% for the pet) which is probability information indicating the probability that the object identified from the modified image is the identified type of object.

In step S940, the object identifying apparatus may determine the type of the object in the received image based on the plurality of identification results. In this case, the object identifying apparatus may determine the type of object having the highest recognition rate, among the plurality of identification results, as the type of the object in the received image.

In the meantime, when the highest recognition rate is lower than the predetermined reference set value, the object identifying apparatus may differently adjust the modification degree of modifying using the predetermined methods to regenerate a plurality of modified images and may redetermine the type of the object in the received image, based on the plurality of regenerated modified images.

As another example of determining a type of object in the received image, the object identifying apparatus may determine a type of object having recognition rates, each of which is equal to or higher than a predetermined first set value, with respect to the plurality of items, among the plurality of identification results, as the type of object in the received image. For example, when the first set value is 80% and among a plurality of identification results obtained by applying the plurality of rotated modified images to the neural network, a first highest recognition rate is, for example, 88% for the fan, and among a plurality of identification results obtained by applying the plurality of images modified by adjusting the size to the neural network, a second highest recognition rate is, for example, 81% for the fan, the object identifying apparatus may determine the type of object, "a fan" which shows first and second recognition rates which are higher than the first set value for two items (rotation and size) as a type of the object in the received image.

As another example of determining the type of the object in the received image, the object identifying apparatus generates the plurality of modified images using one of the predetermined methods and among the plurality of identification results obtained by applying the plurality of modified images to the neural network, when the highest recognition rate is equal to or higher than a predetermined second set value (here, the second set value may be higher than the first set value), determines the type of the object having the highest recognition rate as a type of the object in the image. For example, when the second set value is 90% and among the plurality of identification results obtained by applying the plurality of rotated modified images to the neural network, the highest recognition rate is 95% for the fan, the object identifying apparatus may determine "a fan" which is the object having the highest recognition rate in one item as a type of the object in the received image.

Embodiments according to the present disclosure described above may be implemented in the form of computer programs that may be executed through various components on a computer, and such computer programs may be recorded in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. An object identifying apparatus configured to identify an object from an image, the apparatus comprising:
   a memory; and
   one or more processors configured to execute instructions stored in the memory,
   wherein the one or more processors are configured to:
   receive the image;
   modify the received image by predetermined methods to generate a plurality of modified images; and
   apply the plurality of generated modified images to a neural network trained to identify an object from the image to obtain a plurality of identification results and determine a type of an object in the received image based on the plurality of identification results,
   wherein each of the plurality of identification results includes a type of an object identified from the modified image and a recognition rate which is probability information indicating a probability that the object identified from the modified image is the identified type of object,
   wherein the determining a type of an object in the received image comprises determining a type of an object having a highest recognition rate among the plurality of identification results as a type of an object in the received image, and
   wherein the one or more processors are further configured to, based on the highest recognition rate being lower than a predetermined reference set value:
   differently adjust a modification degree of modifying using the predetermined methods and regenerate the plurality of modified images based on the adjusted modification degree; and
   redetermine the type of the object in the received image, based on the plurality of regenerated modified images.

2. The object identifying apparatus according to claim 1, wherein modifying the received image comprises at least one of:
   differently rotating the received image to generate the plurality of modified images;
   differently removing a noise in the received image to generate a plurality of modified images;
   differently adjusting a brightness of the received image to generate a plurality of modified images; or
   differently adjusting a size of the received image to generate a plurality of modified images.

3. The object identifying apparatus according to claim 1, wherein:
   the predetermined methods include at least one of image rotation, noise removal in the image, brightness adjustment of an image, or size adjustment of an image; and
   the one or more processors are further configured to determine a type of an object having recognition rates which are equal to or higher than a set value, respectively, for the plurality of items, among the plurality of identification results, as a type of an object in the received image.

4. The object identifying apparatus according to claim 1, wherein the one or more processors are further configured to:
   train the neural network using a number of learning images that is less than or equal to a predetermined number.

5. An object identifying apparatus configured to identify an object from an image, the apparatus comprising:
   a memory; and
   one or more processors configured to execute instructions stored in the memory,
   wherein the one or more processors are configured to:
   receive the image;
   modify the received image by predetermined methods to generate a plurality of modified images; and
   apply the plurality of generated modified images to a neural network trained to identify an object from the image to obtain a plurality of identification results and determine a type of an object in the received image based on the plurality of identification results,
   wherein the predetermined methods include at least one of image rotation, noise removal in the image, brightness adjustment of an image, or size adjustment of an image,
   wherein the one or more processors are further configured to adjust a modification degree differently for each item and generate a plurality of modified images based on the adjusted modification degree, and
   wherein adjusting the modification degree comprises setting a modification unit and a modification range with respect to the modification degree for every item and differently adjusting the modification degree based on the set modification unit within the set modification range.

6. An object identifying method for identifying an object from an image, the method comprising:
   receiving the image;
   generating a plurality of modified images by modifying the received image by predetermined methods;
   obtaining a plurality of identification results by applying the plurality of generated modified images to a neural network which is trained to identify an object from an image; and
   determining a type of an object in the received image, based on the plurality of identification results,
   wherein each of the plurality of identification results includes a type of an object identified from the modified image and a recognition rate which is probability information indicating a probability that the object identified from the modified image is the identified type of object, wherein the determining a type of an object in the received image comprises determining a type of an object having a highest recognition rate among the plurality of identification results as a type of an object in the received image, and wherein the method further comprises, based on the highest recognition rate being lower than a predetermined reference set value:

differently adjusting a modification degree of modifying using the predetermined methods and regenerating the plurality of modified images based on the adjusted modification degree; and redetermining a type of the object in the received image, based on the plurality of regenerated modified images.

7. The object identifying method according to claim 6, wherein the generating of a plurality of modified images includes at least one of:

differently rotating the received image to generate the plurality of modified images;

differently removing a noise in the received image to generate a plurality of modified images;

differently adjusting a brightness of the received image to generate a plurality of modified images; or differently adjusting a size of the received image to generate a plurality of modified images.

8. The object identifying method according to claim 6, wherein:

the predetermined methods include at least one of image rotation, noise removal in the image, brightness adjustment of an image, or size adjustment of an image; and the determining a type of an object in the received image comprises:

determining a type of an object having recognition rates which are equal to or higher than a set value, respectively, for the plurality of items among the plurality of identification results, as a type of an object in the received image.

9. The object identifying method according to claim 6, further comprising:

before receiving the image, training the neural network using a number of learning images that is less than or equal to a predetermined number.

* * * * *